United States Patent [19]

Rauenhorst

[11] 4,184,538
[45] Jan. 22, 1980

[54] VENTILATING HEAT EXCHANGER FOR BARNS

[76] Inventor: George W. Rauenhorst, 1312 W. Fairview, Olivia, Minn. 56277

[21] Appl. No.: 863,230

[22] Filed: Dec. 22, 1977

[51] Int. Cl.$^2$ .............................................. A23C 3/02
[52] U.S. Cl. ...................................... 165/66; 98/33 R; 165/DIG. 12
[58] Field of Search ................... 165/DIG. 12, 59, 66; 98/33 R

[56] References Cited

U.S. PATENT DOCUMENTS

| | | | |
|---|---|---|---|
| 3,381,747 | 5/1968 | Darm | 165/DIG. 12 |
| 3,581,649 | 6/1971 | Ravenhorst | 98/33 |
| 3,656,542 | 4/1972 | Darm | 165/66 |
| 3,788,388 | 1/1974 | Barkmann | 165/59 X |
| 3,968,833 | 7/1976 | Strindehag et al. | 165/66 |
| 3,977,466 | 8/1976 | Johansson | 165/59 X |
| 3,980,129 | 9/1976 | Bergdahl | 165/59 |

Primary Examiner—Samuel Scott
Assistant Examiner—Margaret A. Focarino
Attorney, Agent, or Firm—H. Dale Palmatier

[57] ABSTRACT

A building such as a barn with a heat exchanging ventilating system including an exhaust duct with a fan drawing spent air from the center of the building and a pair of intake ducts respectively located above and below said exhaust duct, there being conductive heat transfer walls common with the exhaust duct and respectively with the air intake ducts, the air intake ducts also having inlets for outside fresh air, and the outlet ends of the intake ducts extending horizontally to direct air to the outside walls in the building for circulating the fresh air to the outside walls.

18 Claims, 8 Drawing Figures

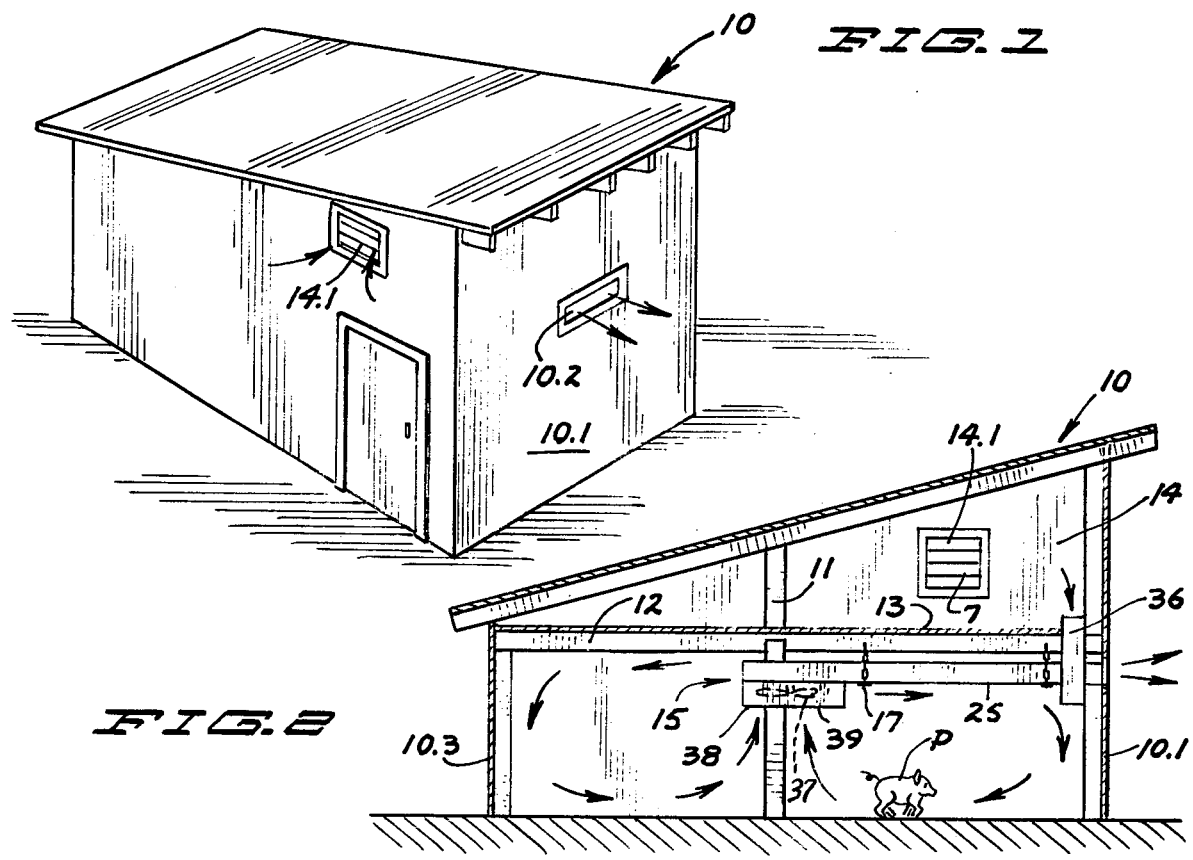
FIG. 1
FIG. 2
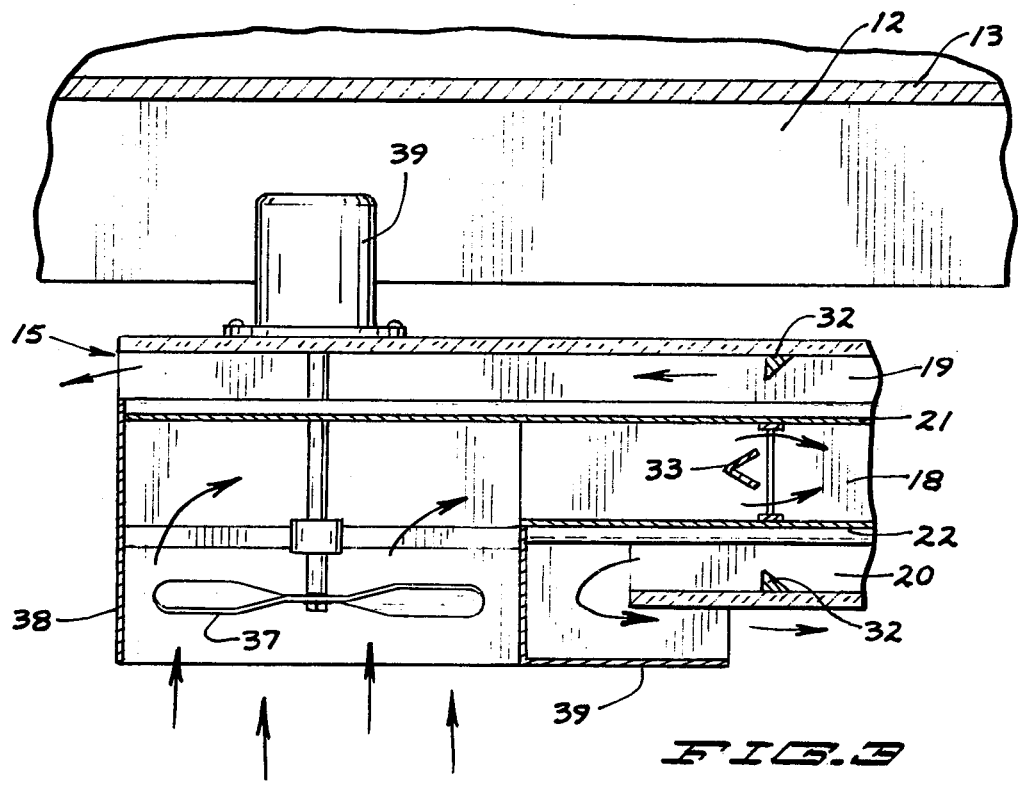
FIG. 3

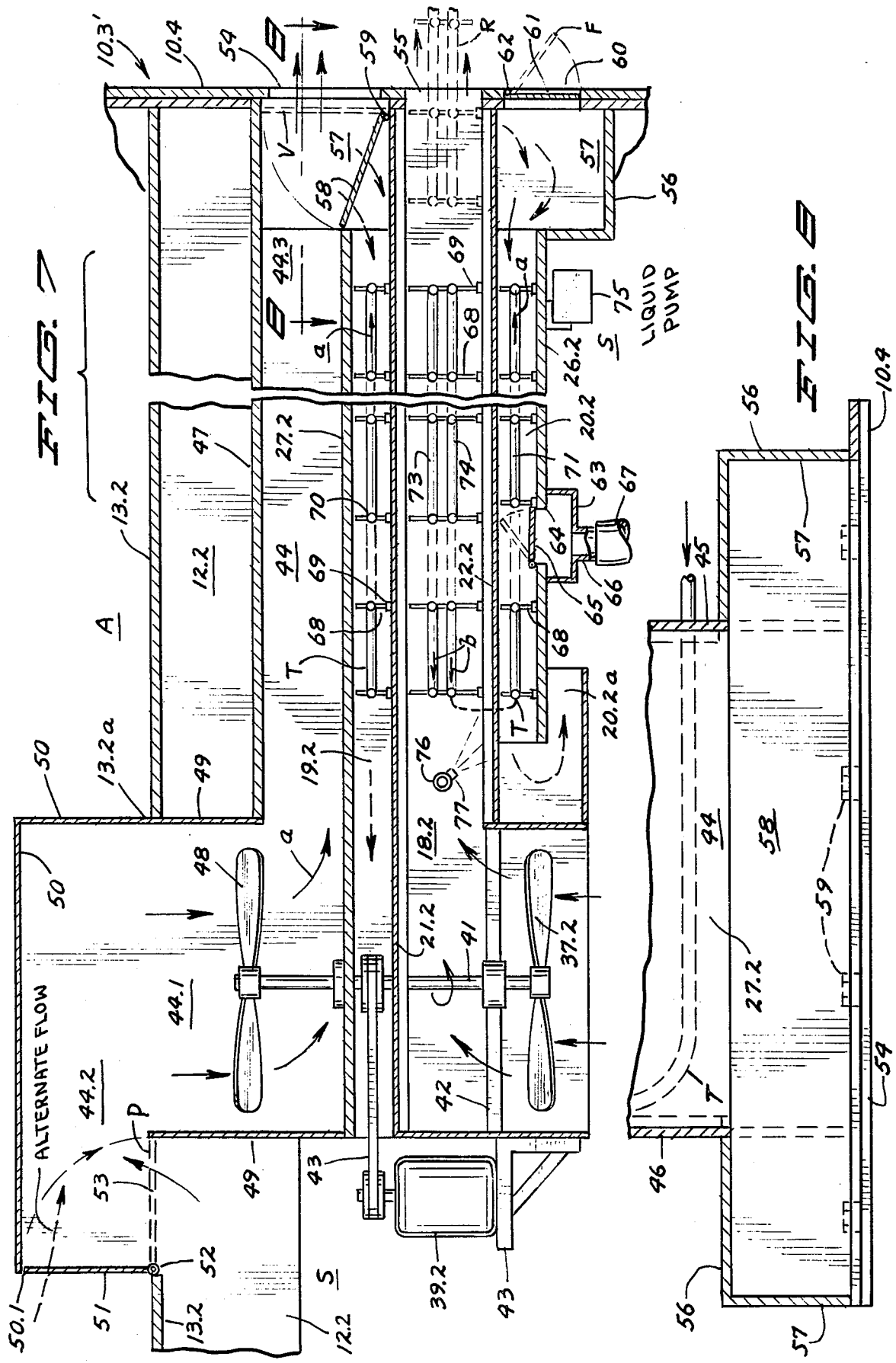

VENTILATING HEAT EXCHANGER FOR BARNS

This invention relates to a ventilating apparatus to reuse the heat in a building while the foul air is replaced by fresh air.

BACKGROUND OF THE INVENTION

In barns or buildings for cattle, pigs and other animals and poultry, and oftentimes in industrial type buildings, the lack of heat is usually not a problem. If the building is reasonably well sealed and insulated, heat given off by the animals is adequate to maintain comfortable temperatures.

Freshness of air in such a building is definitely a problem. The air in the pens and stalls becomes foul, acrid and generally spent unless it is frequently changed.

In the past, discharge of spent air was accompanied with loss of heat, and oftentimes the air in many parts of the barn remained foul for lack of adequate air circulation.

Some use of heat exchangers has been made, but buildup of frost and dust has severly limited the use of such heat exchangers.

SUMMARY OF THE INVENTION

This invention relates to a heat exchanging and ventilating system for animal barns and industrial buildings wherein the air is caused to flow in two complete loops in a natural circulating system with a minimum of drafts and dead spots in the spaces within the building and wherein the spent air is exhausted from the center of the building and the heat from such spent air is extracted and reused. The heated fresh air is supplied into the building spaces at ceiling level and directed in opposite directions outwardly toward the sidewalls; at the sidewalls which are naturally somewhat cooler, the fresh air travels downwardly to the floor level and then inwardly toward the center of the building again and from this location the foul or spent air is exhausted from ceiling level again. The heat in the foul or spent air is extracted and supplied into the fresh incoming air to be reused.

The present system obtains the direction of movement of the air to the extent that each animal in the barn will receive individual available fresh air which has not been previously breathed. This can be accomplished with rather minimal air flow velocities adjacent the floor level and through the pens where the animals are confined with the result that drafts are at an absolute minimum. This nature of flow is accomplished by reason of the fact that the spent air is extracted from the central area of the barn after it has been heated and fouled. The fresh and heated incoming air is drawn by natural circulation to the outside walls where this fresh air progressively moves downwardly along the outside walls and then inwardly toward the central areas of the barn in opposite directions from both outside walls.

When a certain number of air exchanges per hour are required, this can be accomplished at all areas of the barn because of the natural flows as described. Swirling and reuse of the air is absolutely minimized.

The rate of flow of air adjacent each animal is minimal to the extent that the heated air breathed outwardly by each animal will rise because of its temperature sufficiently so that that quantity of air will not be rebreathed again by another animal. Of course, this contributes materially to the prevention or spread of germs and diseases among the animals.

In an overall sense, more fresh air is supplied to each animal in the barn while the overall volume of air handled in the ducts and fans is significantly reduced as compared to other prior systems.

The heat exchanger includes adjoining intake and exhaust ducts with a common wall between which comprises the heat exchanger plate. Preferably the wall is made of industrial plated aluminum for efficient transfer of heat.

Such industrial plated aluminum is plated with a higher grade of aluminum which provides an extremely smooth and slick surface along which the air flows. The surface is almost as smooth as is found on stainless steel and provides essentially no restriction to rapid flow of air along the surface. The extreme smoothness contributes materially to heat transfer because formation of eddies, which would slow down the transfer of heat, is minimized.

The aluminum heat exchange plate has corrugations extending longitudinally of the duct to contribute substantial strength. In a preferred form, the discharge duct is sandwiched between intake ducts which respectively overlie and underlie the discharge or exhaust duct. The exhaust duct has a common heat exchanger wall with each of the intake ducts, and the exhaust duct may be bodily removed from the building and separated from the intake ducts for cleaning by simply sliding it longitudinally outwardly through the building wall.

The heat exchange system is also well adapted for operating the building at varying pressure conditions. By operating at neutral pressure in the building, essentially no air will be forced through the walls of the building. This is extremely important in ventilating barns and utilizing the heat in the foul air for warming the fresh air, because there is no tendency for frost or ice to collect and build up on the walls.

The removable turbulator bars in the ducts may be an integral part of the heat exchange system, and may be conductive pipes carrying liquid as a heat exchanger. The heat exchanging turbulator bars extend into both heated foul air ducts and cold fresh air ducts.

Partly preheated fresh air may be drawn from the attic of the barn. The fresh air intake duct may, by valving, operate in parallel with the exhaust duct, to discharge vast amounts of foul moist air from the barn in the summer, when doors are open, through which fresh air is drawn. By additional valving fresh air may be drawn through the intake ducts, by partly closing the barn doors, and then cooled and directed to snout coolers for penned sows in the barn.

BRIEF DESCRIPTION OF THE DRAWINGS

FIG. 1 is a perspective view of an animal building incorporating the present invention.

FIG. 2 is a longitudinal section view of the building illustrated in FIG. 1 and illustrating the ventilating heat exchange apparatus.

FIG. 3 is an enlarged detail section view of a portion of the ventilating heat exchange apparatus.

FIG. 7 is a longitudinal section view, partly broken away, of another modified form of the apparatus.

FIG. 8 is a detail section view taken approximately at 8—8 in FIG. 7.

DETAILED SPECIFICATION

Figure 4:
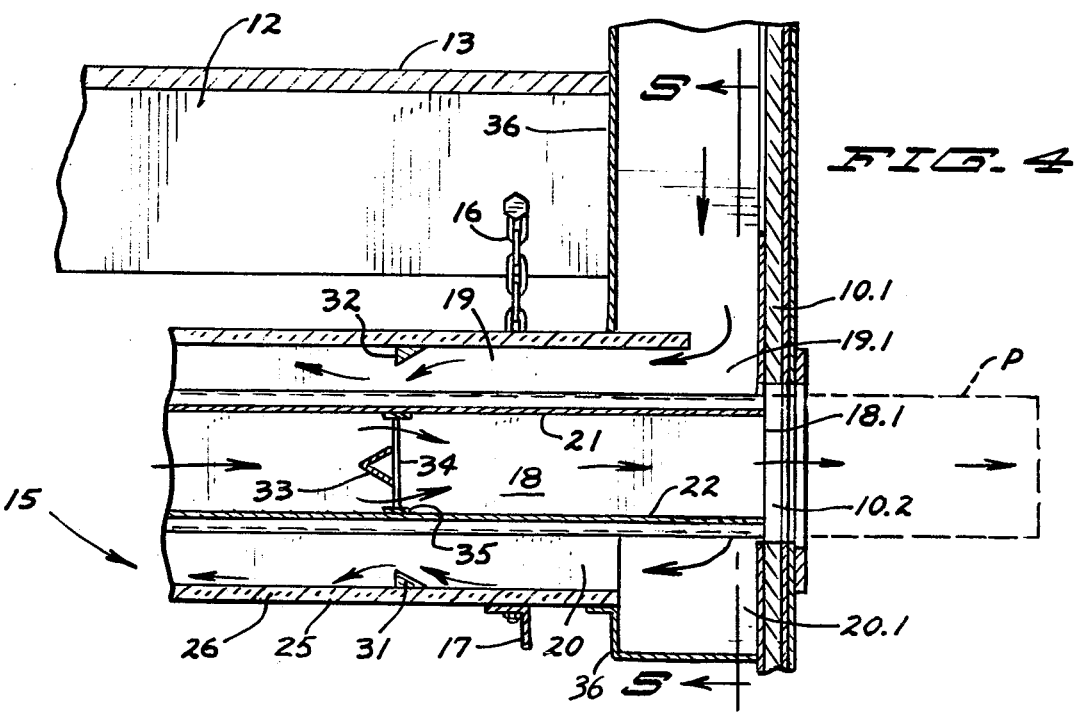
FIG. 4 is an enlarged detail section view of another portion of the apparatus.
Figure 5:
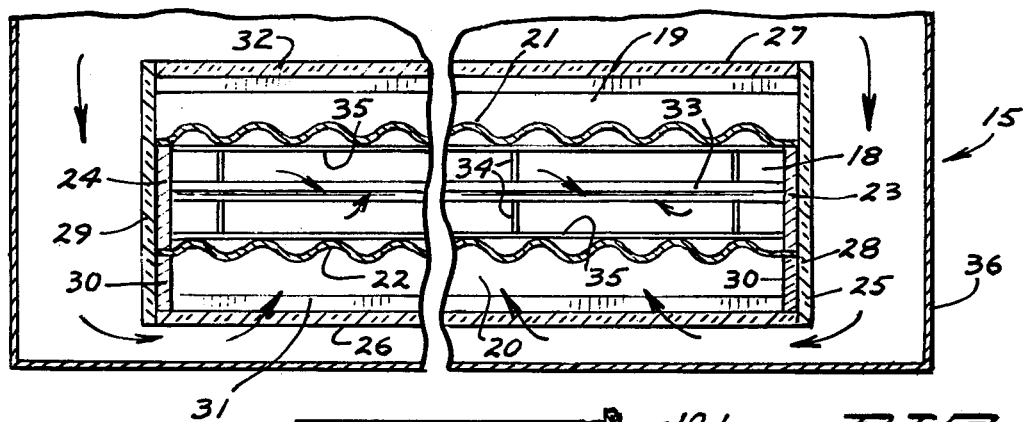
FIG. 5 is a detailed transverse section taken approximately at 5—5 of FIG. 4.

In FIGS. 1 and 2, the building 10 illustrates a barn for animals such as pigs P and has an enclosing outer wall with an access door and the interior of the building is constructed with conventional posts 11 and joists 12 which support a deck or floor 13 of the attic area 14. The ventilating and heat apparatus is indicated in general by numeral 15 and is suspended as by chain-type hangers including rigid crossbars 17 from the joists 12.

The ventilating heat exchange apparatus 15 includes an exhaust duct 18 and a pair of fresh air intake ducts 19 and 20 which are respectively disposed directly above and directly below the exhaust duct.

The exhaust and intake ducts will be seen to have a substantially rectangular cross-sectional shape, which is significantly greater in horizontal width than in vertical height. Preferably, the exhaust duct 18 is approximately twice the cross-sectional area as each of the intake ducts 19 and 20 so that the combined cross-sectional area of the intake ducts approximately equals the cross-sectional area of the exhaust duct 18.

The exhaust duct 18 is formed between a pair of highly conductive industrial plated aluminum panels 21 and 22 which are of corrugated shape with the corrugations or the ridges and grooves extending longitudinally along the duct 18. The aluminum panels 21 and 22 form the heat exchanger panels of the apparatus which extracts the heat from the warm exhaust air flowing through the duct 18 and causes warming of the cooler intake air in the ducts 19 and 20.

The side edges of the aluminum panels 21 and 22 are affixed to the top and bottom edges of sidewalls 23 and 24, both of which are made of wood. The exhaust duct 18, together with the top and bottom and sidewalls which define it, are of separate and distinct construction from all of the other duct work and supporting structure which surround the exhaust duct 18.

A duct housing 25 supports the entire exhaust duct 18 including all of its integrally attached walls, and the housing 25 includes a rigid and insulating bottom panel 26, preferably formed of plywood and heat insulating panels such as styrofoam or expanded polyurethane. Similarly, the top wall 27 is also rigid and formed of plywood with insulating panels attached thereto.

The housing 25 also includes rigid sidewalls 28 and 29 of structural plywood affixed to the bottom panel 26 and the top panel 27. It will be noted as in FIG. 4, that the hanger bar 17 underlies the bottom panel 26 for suspending the entire housing and ducts from the joists 12.

A pair of side rails 30 within the housing 25 underlie the side edges of the bottom panel 22 of the duct 18 and underlie the sidewalls 23 and 24 thereof for the purpose of slidably supporting the entire duct 18 and its defining walls so that the duct 18 may be bodily removed from the housing 25 as illustrated in the dotted line position P illustrated in FIG. 4. Such removal of the duct 18 facilitates maintenance of the duct such as cleaning and removing of debris and dust that may collect from time to time on the upper side of the bottom panel 22.

It will be noted that turbulator bars 31 and 32 are respectively affixed to the bottom panel 26 and the top panel 27 and traverse the entire width of the intake ducts 20 and 19, respectively. Turbulator bars 33 are also provided in the exhaust duct 18, and the bars 33 extend entirely across the width of the exhaust duct. These turbulator bars 33 are affixed as by struts or braces 34 to mounting straps or bars 35 which lie along the heat exchange panels 21 and 22 and are affixed thereto as by screws or rivets.

There are a significant number of the turbulator bars 31, 32 and 33 along the length of the intake and exhaust ducts and preferably such turbulator bars are located approximately every one to two feet along the length of the ducts.

In an alternate embodiment, the turbulator bars 33 and mounting straps 35 may be affixed to and mounted on the sidewalls 23 and 24, but free of panels 21 and 22; and the panels 21 and 22 may be affixed to the rigid sidewalls 28 and 29 and to the rails 30 so that the panels 21 and 22 will remain stationary in the duct housing and the turbulator bars 33, together with the bars 35 and struts 34, will be removable from the housing by endwise sliding, to facilitate cleaning the panels which remain in place in the housing.

The discharge end 18.1 of the exhaust duct is located immediately adjacent the outside wall 10.1 of the building, and an exhaust port 10.2 is provided in the wall to allow the exhaust air to be discharged. The same port 10.2 allows the exhaust duct 18 to be longitudinally moved by sliding to the outward position as indicated by the dotted lines P in FIG. 4. It will be understood that the duct 18 may be entirely removed from the building for cleaning and maintenance.

In the form illustrated in FIGS. 1–5, the inlet ends 19.1 and 20.1 of the intake ducts 19 and 20 are supplied with fresh, but cold air through a conduit or duct work housing 36 which extends upwardly along the outside wall 10.1 and through the deck 13 into the attic area 14. Fresh air is allowed to enter the attic area of the building through louvered access openings 14.1. The housing or duct work 36 is open and unobstructed at its upper end in the attic area so that air may easily enter the intake ducts 19 and 20. By virtue of the housing or conduit 36, the source of fresh air for the intake ducts is significantly separated from the location of the discharge of the spent air from the exhaust duct 18.

An exhaust fan 37 is located adjacent the receiving end of the exhaust duct 18 and preferably located approximately midway between the outside walls 10.1 and 10.3 of the building so as to withdraw the foul or spent air from the interior spaces within the building. The fan 37 is confined in a receiving or plenum chamber 38 and is driven by an electric motor 39 so as to deliver the foul or spent air into the receiving end of the exhaust duct 18. With the fan 37 arranged as illustrated, the fan creates a negative pressure in the building which causes air to be drawn in through the ducts 19 and 20.

In an alternate embodiment, fans may be arranged in the ducts 19 and 20 to draw fresh air through the ducts 19 and 20 into the building. In the event the fans in ducts 19 and 20 replace the fan 37 in the exhaust duct, a positive pressure will be created in the building, slightly in excess of atmospheric pressure so as to cause outward flow of exhaust air through duct 18. It may be desirable in some instances to operate the building at a neutral interior pressure, substantially the same as atmospheric pressure, and in this event, the exhaust fan will remain in the duct 18 and be operated to draw exhaust air from the building and move the air outwardly through duct 18; and additional fans will be arranged in ducts 19 and 20 to draw air from the exterior of the building through the ducts 19 and 20 in the direction indicated so as to supply fresh air into the building as indicated. In this arrangement, the action of the fans in the several ducts 18, 19 and 20 may be balanced so that the pressure within the building will be essentially neutral or substantially the same as atmospheric pressure at the exterior. Also see the embodiment of FIGS. 7 and 8 creating neutral pressure in the barn.

It will be seen that the upper intake duct 19 extends horizontally along the entire length of the exhaust duct 18 and then across the top of the receiving chamber or plenum 38 so that the delivery or outlet end of the intake duct 19 directs the intake air substantially horizontally toward the outside wall 10.3 of the building.

The lower intake duct 20 has an additional length of duct work 39 attached to the delivery or outlet end thereof so as to direct the outlet of the intake duct 20 in a horizontal direction opposite to that in which duct 19 is directed and thereby direct air from the outlet end of intake duct 20 toward the outside wall 10.1 of the building.

Because both of the intake ducts direct incoming fresh air from the central area of the interior space of the building and outwardly in a horizontal direction toward the outside walls of the building, the fresh incoming air is circulated first outwardly and then downwardly along the outside walls, from which the air will be circulated toward the center of the interior space of the building and then ultimately be returned to the fan 37 and the exhaust duct 18.

It should be understood that the spent air or exhaust air received by the exhaust duct 18 is the warmest air in the building. As the air travels along the exhaust duct 18, the air is maintained in a state of moderate turbulence by the turbulator bars 33 and the heat from the exhaust air is transferred through the heat exchange panels 21 and 22 into the cooler incoming air flowing in the intake ducts 19 and 20. The industrial plated aluminum of panels 21 and 22 is extremely smooth, substantially as smooth as stainless steel, and minimizes the formation of eddies in the air moving at the surface of these panels. Heat transfer is thereby made significantly more efficient.

Depending upon the speed of air flowing in the exhaust and intake ducts, and the relative sizes of these ducts, up to 90 percent of the heat of the exhaust air can be salvaged and returned into the building by transfer into the incoming fresh air. In a typical example of a turkey barn of approximately dimensions of 72 feet by 40 feet and containing 380 tom turkeys, 10 cubic feet of air per bird per minute is circulated through the heat exchange ventilating system. When the ambient exterior temperature is at $-20°$ F., the incoming fresh air has a temperature in the range of $2°$ to $20°$ F. above zero and the interior building temperature is approximately $40°$ to $50°$ which is perfectly adequate for this intended use.

It should be understood that the motor 39 may have a variable speed characteristic as to vary the quantity of air moved by the fan 37 and of course as the amount of air being moved is varied, the relative proportion of heat transferred from exhaust to intake air also varies. Control of the air may also be effected by variable shutters or variable pitch louvers or bars in the ducts, and in certain instances it may be desirable to make the sidewalls of the ducts movable as to collapse or enlarge the cross-sectional area of the ducts and thereby change the volume and change the speed of the air in the ducts to increase the heat exchange.

The flow of air through the exhaust duct which carries the spent air from the barn has a high enough velocity so that the collection of dust on the lower heat exchange panel 22 is minimal and the exhaust duct is thereby considered to be self-cleaning.

Due to the standard nature of materials used in the heat exchange panels 21 and 22 and in the insulated structural panels 26 and 27, it is preferable that the duct work is approximately four feet wide. All of these basic materials come in sections of four foot width. The exhaust and the intake ducts are preferably scaled to have one inch of vertical spacing between the top and bottom panels thereof for every one hundred inches of length. In one typical example wherein the ducts are twenty-four feet long (288 inches), the fresh air intake ducts 19 and 20 have a height of approximately 2.88 inches, and the exhaust duct 18 has twice the height as compared to each of the intake ducts.

In one modified form of the invention, the lower intake air duct 20 may be eliminated and all of the intake air will move through a single brake duct overlying the exhaust duct. In this arrangement, the size of the intake and exhaust ducts will be substantially the same and there will be only a single common wall between intake and exhaust ducts and the bottom wall of the exhaust duct will be of an insulating nature.

Figure 6:
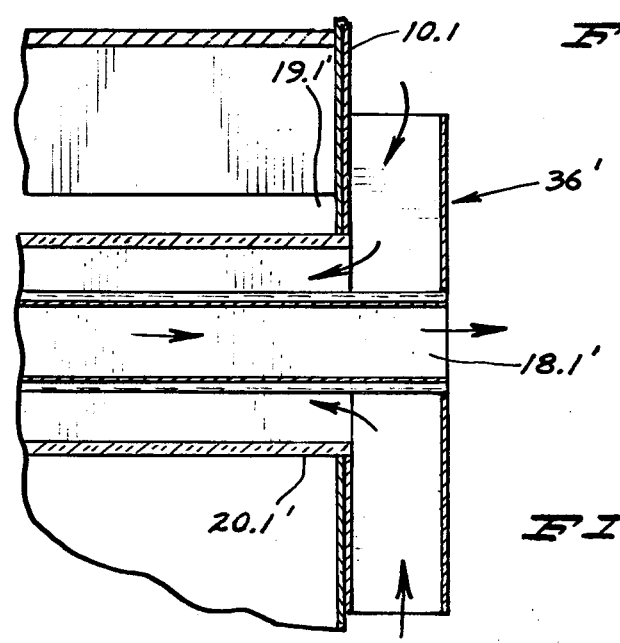
FIG. 6 is a longitudinal section view of a portion of a modified form of the apparatus.

In another modified form of the invention illustrated in FIG. 6, a duct work or housing 36' is mounted at the exterior of the building wall 10.1', and the inlet ends 19.1' and 20.1' of the intake ducts open entirely through the outside wall 10.1' and into the interior of the duct work or housing 36'. The discharge end 18.1' extends transversely through and to the exterior of the housing or duct work 36' as to significantly separate the locations of the air discharged from the exhaust duct and the air drawn into the intake ducts.

In the form of the invention illustrated in FIGS. 7 and 8, a number of modifications of the form of the invention previously described are illustrated. More particularly, this form of the invention provides for neutral pressure in the barn; supplementing the heat exchange function combined with turbulating the flowing air; drawing partly preheated fresh air from the attic of the building or barn, alternately exhausting massive amounts of foul air from the barn for summertime use; and drawing limited amounts of fresh air into the duct system during such summertime exhausting of massive amounts of foul air, for special use in the barn such as snout coolers for hogs.

More particularly, it will be recognized in FIG. 7 that an exhaust duct 18.2, and fresh air intake ducts 19.2 and 20.2 are arranged relative to each other and relative to the barn or building 10.3', in substantially the arrangement of the ducts 18, 19 and 20 of the form illustrated in FIGS. 1-5. The attic deck 13.2 supported on the joists 12.2 separates the lower animal spaces S from the attic area A above the deck 13.2.

Corrugated aluminum panels 21.2 and 22.2 separate the ducts 19.2 and 20.2 from the exhaust duct 18.2 for transfer of heat between the exhaust and intake air flowing in these ducts. Insulating panels 26.2 and 27.2, respectively, define the bottom and top panels of ducts 20.2 and 19.2, respectively. As previously described in connection with FIGS. 1-5, the intake end of exhaust duct 18.2 is located approximately at the center of the barn 10.3 and the exhaust end of the duct 18.2 opens outwardly through the outer wall 10.4 of the barn. An exhaust fan 37.2 is located at the intake end of the exhaust duct 18.2 and is mounted on a rotary shaft 41 supported by bearings and bracket structure 42 at the intake end of the ehaust duct 18.2. The shaft 41 is rotated by a belt and pulley assembly 43 which is driven by a motor 39.2 supported on a bracket 43 on the side of the duct 18.2 adjacent the intake end thereof.

An additional dual purpose exhaust and intake duct 44 is arranged in superposed relation to the duct 19.2 and the panel 27.2 forms the bottom of duct 44. The duct 44 has sidewalls 45 and 46 which comprise extensions of the sidewalls of the other ducts 18.2, 19.2 and 20.2 and are coplanar with such other sidewalls. A top panel 47 forms the upper side of duct 44. The fan shaft 41 extends upwardly into the intake end of duct 44 and has a fan 48 carried thereon and oriented to direct air through the duct 44, always in the direction of arrows a. Adjacent the fan 48, the duct has an upwardly extending intake end 44.1 enclosed by upright panel structure 49 and extending through an opening 13.2a in the attic deck 13.2.

An intake end 44.2 of the duct 44 is defined above the deck 13.2 by superstructure 50 disposed above the deck 13.2. The superstructure 50 is open at one side 50.1, at a location above the attic deck 13.2 for the purpose of drawing fresh air into the superstructure 50 which directs the air into the intake end 44.2 of the duct 44.

It will be noted that the superstructure 50 is a box-like enclosure which allows air to enter into it only from the open side 50.1.

The opening 13.2a in the attic deck 13.2 extends beyond the upright panel structure 49 and defines a second opening 53 into the inlet end 44.2 of the duct 44. The opening 53 is adjacent to the open side 50.1 of the superstructure 50 and is thereby well adapted to be controlled by a single panel or air valve 51 which is hinged at 52 to the adjacent edge of the attic deck 13.2.

In one position, the air valve or panel 51 entirely closes the open side 50.1 of the superstructure so as to prevent any air flow into the inlet end 44.2 of duct 44 from the attic space A. In this position of the panel 51, the inlet opening 53 is entirely open and allows the spent or foul air to be drawn into the inlet end 44.2 of the duct 44 from the cattle spaces S below the attic deck 13.2.

When the panel 51 is swung to the dotted line position thereof, the intake opening 53 is entirely closed, thereby preventing any flow of the spent or foul air from the cattle spaces S into the intake end 44.2 of duct 44. In this dotted line position P of the panel 51, the open side 50.1 of the superstructure is left entirely open so that fresh air may be withdrawn from the attic spaces A into duct 44. In this regard, it should be noted that in wintertime conditions, the air in the attic spaces of the building is at least slightly warmer than the ambient air at the exterior of the building. Accordingly, the air drawn from the attic spaces A can be considered at least partly preheated.

Adjacent the discharge end 44.3 of the duct 44, there is an opening 54 through the outer wall 10.4 of the building so that the air directed from the discharge end 44.3 may be entirely discharged to the exterior atmosphere. This discharge to the atmosphere is especially important in summer conditions when the air valve panel 51 is in the full line position shown so that massive amounts of air can be withdrawn from the animal spaces S of the barn and discharged to the atmosphere. At this same time, approximately similar quantities of spent air are being discharged through duct 18.2 and through the opening 55 in the barn wall to the atmosphere.

A box 56 is provided adjacent the outside wall 10.4 of the building for the purpose of interconnecting the discharge end 44.3 of duct 44 with the intake ends of ducts 19.2 and 20.2. The box 56 embraces the outer end of duct 18.2 but is not in air flow communication therewith. The box 56 defines a transverse interior flow space or passage 57 which connects directly with the intake end of duct 19.2 and which extends downwardly around duct 18.2 and to the intake end of the duct 20.2.

Air flow through the passages 57 in the box 56 is controlled by a panel or air valve 58 carried on hinges 59 adjacent the lower edge of the opening 54 in the wall. The panel 58 traverses the width of box 56 so that in one position, the panel 58 engages the end of panel 27.2 so as to direct all of the air from the discharge end 44.3 outwardly through the opening 54 in the building wall. It will be seen in FIG. 8 that the panel 58 traverses the entire width of duct 44 and extends beyond the side of the duct 44 so as to obstruct the entire interior of the box 56 so that the downwardly extending passages 57 are entirely obstructed; thereby preventing, when the panel 58 is in the full line positioned illustrated in FIG. 7, any air to flow from the discharge end 44.3 of duct 44 into either of the ducts 19.2 or 20.2.

When the air valve or panel 58 is swung upwardly to the vertical position V, the discharge opening 54 through the wall is entirely obstructed; and the discharge end 44.3 of duct 44 is in open air flow communication through passages 57 to the intake ends of both of ducts 19.2 and 20.2. This dotted line position V of panel 58 is the normal wintertime position of the panel so that the partly preheated air from the attic spaces A can be directed through ducts 19.2 and 20.2 to absorb heat from the spent air being discharged through duct 18.2 by reason of the heat transfer through the aluminum panels 21.2 and 22.2.

An additional opening 60 is provided through the wall 10.4 at the lower end of box 56 so as to provide a fresh air inlet into the passage 57 and into the intake end of duct 20.2. The opening 60 is normally obstructed by an air valve panel 61 hinged to the building wall at 62 and facilitating opening of the panel to a dotted line position F to permit fresh air to be drawn into duct 20.2.

Although the duct 20.2 has its normal discharging end 20.2a oriented to direct the fresh air toward the outside wall of the building, an alternate arrangement is provided for discharging air from the duct 20.2. A receiving or plenum box 63 is suspended from the bottom panel 26.2 and is in communication with an opening 64 in the panel 26.2. An air valve panel 65 is hinged to the duct panel 26.2 to normally obstruct the opening 64, but swingable into the dotted line position shown to obstruct the entire width of the duct 20.2 and thereby direct all of the flow of air through the opening 64 and through the box or plenum 63. The plenum 63 has one or more discharge duct fittings 66 thereon and communicating with discharge openings in the plenum box 63 to facilitate connection of flexible hoses 67 for carrying air to localized uses in the animal spaces S. Such air hoses are often used as snout coolers where air is directed into one end of a sow's pen so that her snout may be cooled by the flowing fresh air and this will tend to cool the entire body of the sow.

In the ducts 18.2, 19.2 and 20.2, turbulator bars T are supported by struts 68 and crossbars 69 on the panels 26.2, 22.2, and 21.2. The turbulator bars T, in this form of the invention, are liquid-carrying pipes, preferably of a highly conductive material such as copper or aluminum. The turbulator bars contribute to the turbulence of the flow of air through the ducts, and also provide a heat exchange function. The pipes forming the turbulator bars traverse the entire width of the ducts in a zigzag course so that there is an exchange of heat between the air in the duct and the liquid in the pipe across the entire width of the duct and throughout a substantial portion of the length thereof.

The pipes 70 and 71 of the turbulator bars T in ducts 19.2 and 20.2, respectively, are connected to the individual pipes 73 and 74, respectively, of the turbulator bars T in the duct 18.2, and the pipes are connected to a pump 75 for circulating the liquid through the turbulator bars. The liquid in all of the turbulator bars flows in a direction opposite to the flow of air through the duct in which the turbulator bar is located, and accordingly, the liquid in pipes 70 and 71 is moving in the direction of arrow a and the liquid in the pipes 73 and 74 is going in the direction of arrows b.

The pipes 73 and 74 forming the turbulator bars T in duct 18.2 may be disconnected and mounted on the panel 22.2 so that they may be slid longitudinally outwardly through the opening 55 of the barn wall into the dotted line position R illustrated and outwardly therebeyond so that the entire turbulator bars T may be removed from the duct 18.2. Normally the turbulator bars will be removed from the duct 18.2 for summertime operation at which time no heat transfer function is being performed.

A manifold pipe 76 traverses the entire width of duct 18.2 and has a plurality of spray nozzles 77 mounted thereon for directing fans of sprays across the air flowing outwardly through the duct 18.2 and for cooling the bottom panel 22.2 for summertime usage and thereby facilitating the cooling of the incoming air in duct 20.2 when the air valve panel 61 is swung to its open position F.

It should be recognized that during wintertime usage the partly preheated air is drawn from the attic spaces A, through the duct 44 and then this fresh air is directed through ducts 19.2 and 20.2 into the barn. Simultaneously, spent air is being exhausted through duct 18.2. Because of the use of two separate fans 48 and 37.2, a substantially neutral pressure condition is maintained in the cattle spaces S of the barn. As a result, even though the barn walls may not be absolutely tight, the ventilating system will operate highly successfully in the manner described. The incoming fresh air is directed across the upper portions of the spaces S and toward the outside wall from which location this fresh air circulates downwardly and progressively toward the central areas of the spaces S. The spent air is drawn from the central portions of the spaces S, and then the heat is extracted from this spent or foul air and used to heat the incoming fresh air.

During summertime usage, the panel 51 is swung to the full line position thereof and the panel 58 is swung to its full line position illustrated in FIG. 7 so that massive amounts of foul spent air is discharged from the center of the building. The doors may be left open in the building sidewalls at this time so that fresh air can readily find its way through the cattle spaces. By partly closing the outside doors of the building, fresh air can be drawn through opening 60 and duct 20.2 while all of the massive amounts of spent air are being discharged through ducts 44 and 18.2 so that the snout coolers may be supplied with air from hoses 67. This incoming air in duct 20.2 will be cooled by the cold water sprayed onto panel 22.2 from the nozzle 77.

It will be seen that I have provided a new and improved ventilating with heat exchange system for animal barns and industrial buildings to extract the heat from the spent air and cause the cooler intake air to be warmed as it moves into the building. The intake air, which is fresh, is directed horizontally from the center of the building outwardly to the outside walls and this fresh intake air is then caused to circulate downwardly and back again toward the central area of the building and as the air becomes fouled, heated and spent, it will be withdrawn through the exhaust duct, aided by an exhaust fan, to again have the heat exchanged into incoming fresh air. The common heat exchange panels are formed of highly conductive and industrial plated aluminum which are extremely smooth to efficiently transfer heat from the exhaust to the intake air. The exhaust duct is entirely removable by bodily sliding it longitudinally outwardly from the building for cleaning and maintenance. Preferably air velocities are maintained in the exhaust duct so that the collection of dust on the heat exchange panel will be absolutely minimal.

It will further be seen that partly preheated fresh air can be drawn from the attic spaces of the building for wintertime usage and this same duct work can discharge massive quantities of air from the cattle spaces for summertime usage. The heat exchange between the spent air and fresh air is increased by the use of the heat exchanging turbulator bars carrying circulating liquid which extracts heat from the spent air and delivers the heat to the incoming fresh air. As a result, substantially no supplemental heating is required in the barn and the cattle spaces are continually supplied with larger and adequate amounts of fresh air without unduly cooling the cattle spaces.

What is claimed is:

1. A ventilating with heat exchange system to be mounted adjacent the ceiling within a barn or similar building comprising
    an elongate exhaust air duct and an elongate intake air duct extending horizontally along and adjoining each other and having a common wall extending substantially the full length of said ducts and formed of a heat conducting material to transfer heat from the warm air flowing in the exhaust duct to the cooler air flowing in the intake duct, the exhaust duct having a discharge end adjacent the inlet end of the intake duct, duct means on one of said adjacent ends of the adjoining ducts and significantly separating the source and delivery locations of the intake and exhaust air ducts respectively, the open receiving end of the exhaust duct and the open outlet end of the intake duct being disposed adjacent each other to be located near the center of the building between the outside walls thereof, the outlet end of the intake duct also extending horizontally to direct fresh air horizontally and to remote locations adjacent the outside wall of the building, and fan means in one of the ducts and inducing flow of foul warm air through the exhaust duct and fresh air through the intake duct.

2. A ventilating with heat exchange system to be mounted adjacent the ceiling within a barn or similar building, comprising a pair of elongate intake air ducts and an elongate exhaust air duct extending horizontally along and sandwiched between said intake air ducts, the exhaust air duct having a pair of heat conducting walls each forming a common wall with a respective intake air duct to transfer heat from the warm air flowing in the exhaust duct to the cooler air flowing in the intake ducts, the exhaust duct having a discharge end adjacent the inlet ends of the intake ducts, duct means on one of the adjacent discharge and inlet ends of the exhaust and intake ducts respectively and significantly separating the source and delivery locations of the intake and exhaust air respectively, the open receiving end of the exhaust duct and the open outlet ends of the intake ducts being disposed adjacent each other to be located near the center of the building between the outside walls thereof, the outlet ends of the intake ducts also extending horizontally and in opposite directions relative to each other to direct the fresh air oppositely in horizontal directions toward the outside walls of the building and away from the receiving end of the exhaust ducts, and fan means in one of the ducts and inducing flow of foul air through the exhaust from the center of the building and also inducing flow of fresh air through the intake ducts and toward opposite outside walls of the building.

3. The ventilating with heat exchange system according to claim 2 and said exhaust duct including both of said common walls being slidable endwise relative to the intake ducts for separation from said intake ducts for cleaning and service.

4. The ventilating with heat exchange system according to claim 2 and the heat conducting common walls being formed of industrial plated aluminum sheet material and accordingly being smooth surfaced to minimize interference with flowing air and exchange of heat therefrom.

5. The ventilating with heat exchange system according to claim 2 and including turbulator bars extending transversely across each of the exhaust and intake ducts for changing the direction of flow of air therein and causing larger portions of the air to engage the common walls for exhange of heat therethrough.

6. The ventilating with heat exchange system according to claim 3 and said common walls being constructed of aluminum sheet material corrugated and having ridges and valleys extending longitudinally of the ducts.

7. The ventilating with heat exchange system according to claim 2 and the exhaust and intake ducts having substantially rectangular cross sectional configurations, the intake ducts being located above and below the exhaust duct, each of said ducts having a width and a horizontal direction significantly greater than the height thereof in a vertical direction.

8. The ventilating with heat exchange system according to claim 2 the upper intake duct having a top wall and the lower intake duct having a bottom wall, said top and bottom walls confronting the common walls and being of heat insulating material to confine the heat of the fresh air being warmed in said intake ducts.

9. The ventilating with heat exchange system according to claim 2 and including turbulator means in the ducts and causing significant portions of the air to engage the common walls for exhanging heat therethrough.

10. The ventilating with heat exchange system according to claim 5 and means including the turbulator bars in the exhaust duct being slidably removable.

11. In combination with a barn-like building having broad and open interior spaces extending between widely separated sidewalls which entirely enclose the building interior, a ventilating heat exchange apparatus including elongate exhaust and intake air ducts extending horizontally along and adjoining each other and between the sidewalls of the building and a central portion of the open interior building between the sidewalls thereof, the intake air duct being in superposed relation with the exhaust air duct and having a common wall with the exhaust air duct and formed of heat conducting material to transfer heat from the warm air flowing in the exhaust duct to the cooler air flowing in the intake duct, the exhaust duct having a discharge end opening through a port in the sidewall of the building and disposed adjacent the inlet end of the intake duct, intake conduit means connected with the inlet end of the intake duct and delivering fresh air thereto and significantly separating the source and delivery locations of the intake and exhaust ducts respectively, the receiving end of the exhaust duct and the outlet end of the intake duct being disposed adjacent each other at the central portion of the building interior between the sidewalls thereof, the outlet end of the intake duct extending horizontally toward one of the building sidewalls to direct fresh air toward said sidewall, and fan means in at least one of the ducts and inducing air flow through the exhaust and intake ducts to draw foul air from the center of the building and direct fresh air into the building and toward the sidewall of the building.

12. The invention according to claim 10 and a second intake air duct extending along said first mentioned intake air duct with the exhaust duct sandwiched between the intake air ducts, there being common walls between the exhaust air duct and both intake air ducts, both intake air ducts being connected to said intake conduit means, and the outlet ends of said intake ducts both extending horizontally, but in opposite directions toward the opposite sidewalls of the building, the building having a horizontal attic deck above said heat exchange apparatus, said intake conduit means including a fresh air duct in superposed relation with all of said intake and exhaust air ducts and having an inlet end opening upwardly through said attic deck to draw fresh air from the attic spaces of the barn-like building.

13. The invention according to claim 12 wherein said fresh air duct and said exhaust duct are both substantially larger in cross-sectional area than said intake air ducts.

14. The invention according to claim 12 and said fan means including a fan in each of said exhaust air ducts and said fresh air duct.

15. The invention according to claim 14 and said fresh air duct having a delivery end opening through a sidewall of the building, and valve means alternately connecting said delivery end of the fresh air duct through the sidewall and into the intake air ducts, and additional air valve means alternately connecting the receiving end of the fresh air duct to the spaces above and below, respectively, of the attic deck.

16. The invention according to claim 12 and said exhaust and intake air ducts having liquid-carrying tubular turbulator bars circulating air between the exhaust and intake ducts and transferring heat between the air flowing in the exhaust and intake ducts.

17. The invention according to claim 16 and the tubular turbulator bars in said exhaust duct being removable therefrom and slidable out through the wall of the building.

18. The invention according to claim 10 and the building also having attic spaces in superposed relation to such interior spaces and separated therefrom by an attic deck, the inlet end of the intake air duct extending into the attic space to receive fresh air therefrom.

* * * * *

UNITED STATES PATENT AND TRADEMARK OFFICE
CERTIFICATE OF CORRECTION

PATENT NO. : 4,184,538
DATED : January 22, 1980
INVENTOR(S) : George W. Rauenhorst It is certified that error appears in the above-identified patent and that said Letters Patent are hereby corrected as shown below:

In claim 12, column 12, line 34, delete "10" and substitute --11--.

In claim 18, column 13, line 5, delete "10" and substitute --11--.

Signed and Sealed this

Tenth Day of June 1980

[SEAL]

Attest:

SIDNEY A. DIAMOND

Attesting Officer

Commissioner of Patents and Trademarks